United States Patent

Chae

[11] Patent Number: 5,815,393
[45] Date of Patent: Sep. 29, 1998

[54] AIRBAG DEPLOYMENT CONTROL APPARATUS FOR VEHICLE AND THE METHOD

[75] Inventor: Kyeong-Seon Chae, Seoul, Rep. of Korea

[73] Assignee: Daewoo Electronics Co., Ltd., Seoul, Rep. of Korea

[21] Appl. No.: 550,791

[22] Filed: Oct. 31, 1995

[30] Foreign Application Priority Data

Oct. 31, 1994 [KR] Rep. of Korea .................. 1994-28168

[51] Int. Cl.⁶ ............................................ B60R 21/32
[52] U.S. Cl. .............................. 364/424.056; 280/735; 180/282; 340/436; 307/10.1
[58] Field of Search ................ 364/424.055, 424.056, 364/424.057; 280/734, 735; 180/271, 282; 307/10.1; 340/436, 438, 667

[56] References Cited

U.S. PATENT DOCUMENTS

| 5,037,129 | 8/1991 | Fritz et al. ............................... 280/735 |
| 5,109,341 | 4/1992 | Blackburn et al. ....................... 280/735 |
| 5,182,459 | 1/1993 | Okano et al. ............................ 307/10.1 |
| 5,202,831 | 4/1993 | Blackburn et al. ............... 364/424.056 |
| 5,229,943 | 7/1993 | Eigler et al. ............................. 280/735 |
| 5,359,515 | 10/1994 | Weller et al. ...................... 364/424.055 |
| 5,407,228 | 4/1995 | Shibata et al. ........................... 280/735 |
| 5,483,447 | 1/1996 | Jeenicke et al. .................. 364/424.055 |
| 5,497,327 | 3/1996 | Takaya et al. .................... 364/424.056 |
| 5,513,109 | 4/1996 | Fujishima ......................... 364/424.055 |

FOREIGN PATENT DOCUMENTS

| A- 41 28 230 | 5/1992 | Germany . |
| A-42 39 582 | 5/1993 | Germany . |
| A-2 263 571 | 7/1993 | United Kingdom . |
| WO-A-90 03289 | 4/1990 | WIPO . |
| WO-A-90 09298 | 8/1990 | WIPO . |
| WO-A-93 09008 | 5/1993 | WIPO . |
| WO-A-94 14638 | 7/1994 | WIPO . |

Primary Examiner—Gary Chin
Attorney, Agent, or Firm—Fish & Richardson P.C.

[57] ABSTRACT

An airbag deployment control apparatus includes a 3-direction accelerometer and a crash-pattern discriminating portion in order to reliably distinguish a slight crash from a serious crash or vice versa. The 3-direction accelerometer generates deceleration signals of traveling, right-left and upper-lower directions of a vehicle. The deceleration signals generated are inputted to an integrator to be converted into 3-direction velocity change signals. In the crash-pattern discriminating portion, crash patterns are discriminated by use of the 3-direction velocity change signals. In an airbag-deployment determining portion, the velocity change is compared with a threshold for a crash pattern discriminated and an airbag deploying signal is outputted to an airbag deploying portion when the velocity change exceeds the threshold. The threshold is predetermined classified by crash patterns. In practice, since the delay deployment of the airbag is prevented, it is possible to protect passengers reliably.

18 Claims, 8 Drawing Sheets

AIRBAG DEPLOYMENT CONTROL APPARATUS FOR VEHICLE AND THE METHOD

BACKGROUND OF THE INVENTION

1. Field of the Invention

The present invention relates to an airbag deployment control apparatus for an automotive vehicle and the control method therefor, and more particularly to an airbag deployment control apparatus and the method for having a reliable operation characteristic by use of a 3-directional accelerometer.

2. Description of the Prior Art

To protect occupants of a vehicle in case of collision, various safety devices have been developed. An airbag system, one of the safety devices, prevents the occupants from directly colliding with a solid body of the vehicle by means of an inflated airbag. The airbag system generally comprises a crash sensing portion such as an accelerometer, an ECU for determining whether airbag has to be deployed or not and connected to the crash sensing portion to receive a signal therefrom, a gas generating portion for generating gas in response to an airbag deploying signal outputted from the ECU, and an airbag module for deploying with gas generated from the gas generating portion. The gas generating portion is formed of a squib for receiving the airbag deploying signal to explode and an inflator for generating gas to inflate the airbag module. The squib is exploded by the airbag deploying signal received, and thus the inflator is also exploded to generate gas.

In the airbag system, it is most important that the deployment of an airbag is determined accurately under various circumstances. If the airbag is not deployed in a serious crash, a driver may suffer fatal injury. If the airbag is deployed in a slight crash, an accident may take place by blockage of a visual field of the driver and the reinstallation cost of the airbag system is required additionally.

To achieve the most effective protection of passengers, the passenger should come in contact with the airbag when the airbag is fully deployed, so that the optimum ignition timing point classified by crash patterns should be necessarily determined. Generally, the optimum ignition timing point is determined based upon, what is called, "5 inch–30 ms criterion" that head displacement shall be less than 5 inches before the airbag achieves its full deployment and it takes approximately 30 ms to fully deploy the airbag. Accordingly, the determination for deploying the airbag precedes the optimum ignition timing point.

As described above, the performance of airbag system is mainly influenced by whether the deployment of the airbag may be determined before the optimum ignition timing point.

Generally, the airbag system adopts the manner that the deceleration signal from an accelerometer is compared with a threshold and an airbag is deployed in the event that the deceleration signal is greater than the threshold. Therefore, the setting of the threshold directly relates to reliable operation characteristics of the airbag system.

Figure 7:
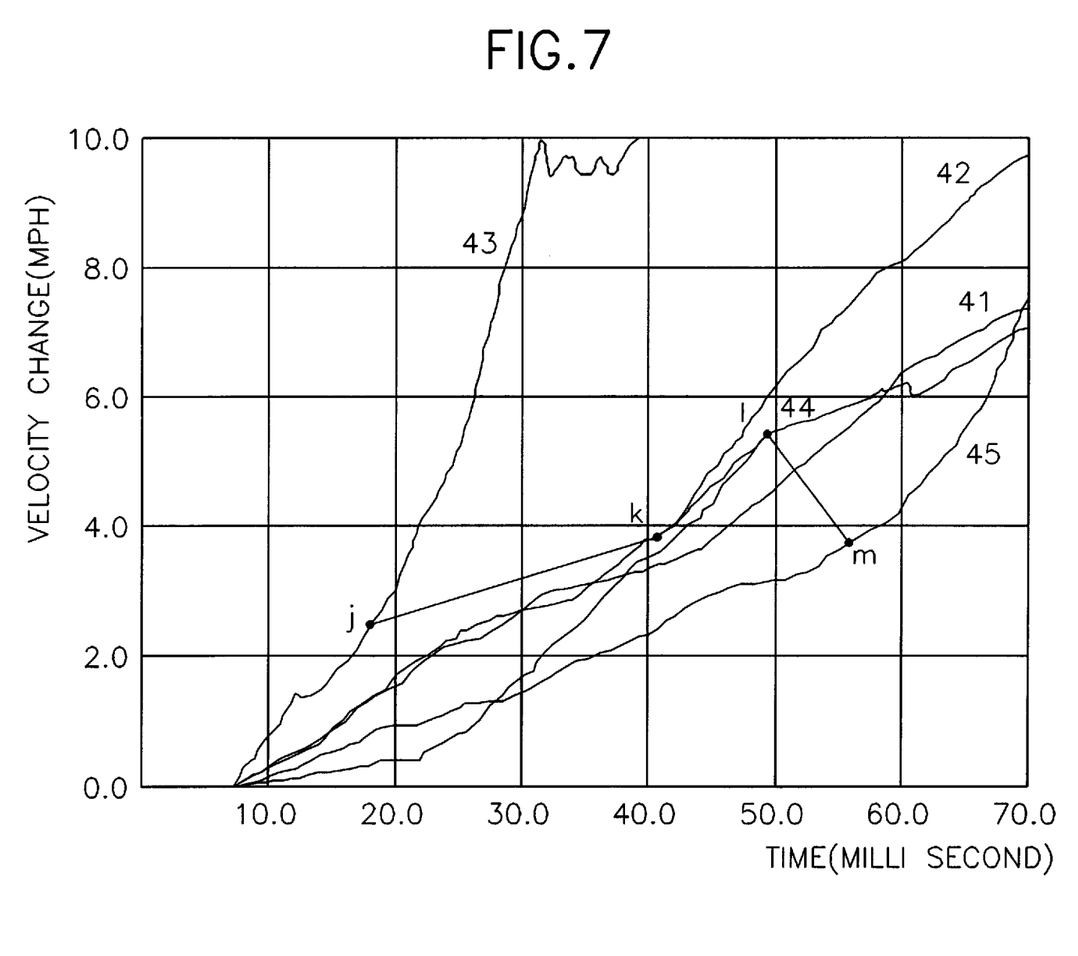
FIG. 7 is a graph showing the primary integral value of the deceleration signal along the front-rear direction of the vehicle having a soft front body.

Because a threshold not classified by crash patterns is utilized in the prior-art airbag system, the passenger is not protected enough in a crash. For example, it is difficult to protect the passenger in a vehicle having a soft front body. FIG. 7 is a graph showing the relationship between velocity change and time obtained under various crash patterns in the vehicle having a soft front body. In FIG. 7, 41 designates a velocity change curve (hereinafter simply referred to as "VC curve") when the vehicle is subjected to an 8-mph frontal crash, 42 a VC curve to a 12-mph frontal crash, 43 a VC curve to a 30-mph frontal crash, 44 a VC curve to a 14-mph 30 degree-angled crash, and 45 a VC curve to a 16-mph center-pole crash. VC curve 41 is a no-deploying limit below which the deployment of airbag is not accomplished. Points j, k, l and m indicated on each of the curves designate optimum ignition timing points. As shown, the airbag can be deployed before the optimum ignition timing point at a 12-mph frontal crash, a 30-mph frontal crash and a 14-mph 30 degree-angled crash, because points j, k and l are positioned in the upper area of VC curve 41 that is the no-deploying limit. However, the airbag cannot be deployed before the optimum ignition timing point at a 16-mph center-pole crash, because point m is positioned in the lower area of VC curve 41.

To overcome the above problem in the prior-art airbag system, soft portions of the vehicle body are strengthened and/or sensors are further installed in the crush zone or other portions of a vehicle so that the velocity change of a vehicle can be detected promptly. In this case, however, the development cost of the airbag system and the installation cost thereof become high, since a number of crash tests are required in order to determine the mounting location of sensors and the structure of a vehicle needs to be changed.

SUMMARY OF THE INVENTION

To solve the above problems, an object of the present invention is to provide an airbag deployment control apparatus capable of reliably generating the airbag deployment signal on a basis of the 3-direction deceleration signal from a 3-direction accelerometer.

Another object of the present invention is to provide an airbag deployment control method capable of reliably generating the airbag deployment signal on a basis of the 3-direction deceleration signal from a 3-direction accelerometer.

To achieve the former object of the present invention, there is provided an airbag deployment control apparatus for an automotive vehicle, comprising:

3-direction deceleration sensing means for sensing vehicle deceleration due to crash and generating 3-direction deceleration signals;

low-pass filter means for removing high-frequency components of the 3-direction deceleration signals outputted from the 3-direction deceleration sensing means;

integrator means for integrating outputs from the low-pass filter means;

first-direction component comparing means for comparing a first-direction component of the outputs from the low-pass filter means with a threshold for first direction;

crash-pattern discriminating means responsive to the integrator means for discriminating crash patterns based upon outputs from the integrator means and generating a crash-pattern information value;

airbag-deployment determining means responsive to the crash-pattern discriminating means for comparing the output from the integrator means with a threshold for crash pattern corresponding to the crash-pattern information value and determining whether an airbag is to be deployed;

clock signal generating means for generating clock signals in order to provide a standard time, the clock signal generation means being reset in response to a reset signal outputted from the first-direction component comparing means when the first-direction component exceeds the threshold for first direction;

duration detecting means being reset responsive to the clock signal generating means for detecting a duration period wherein the first-direction component exceeds the threshold for first direction and providing a reset signal to the first-direction component comparing means to reset the first-direction component comparing means when the duration period does not exceed a predetermined period; and airbag deploying means for generating an electric signal for deploying an airbag in response to an airbag deploying signal from the airbag-deployment determining means.

To achieve the latter object of the present invention, there is provided an airbag deployment control method, comprising the steps of:

(a) sensing vehicle deceleration due to crash and generating 3-direction deceleration signals;

(b) removing high-frequency components of the 3-direction deceleration signals;

(c) comparing a first-direction component of the 3-direction deceleration signals removing high-frequency components with a threshold for first direction;

(d) resetting a clock signal when the first-direction component exceeds the threshold for first direction as a result of the comparison in step (c);

(e) determining whether the state that the first-direction component exceeds the threshold for first direction is maintained over a predetermined period;

(f) integrating the 3-direction deceleration signals removing high-frequency components when the state is maintained over the predetermined period as a result of the determination in step (e);

(g) discriminating a crash pattern based upon the integral value of the 3-direction deceleration signals and generating a crash-pattern information value;

(h) comparing the integral value with a threshold for crash pattern corresponding to the crash-pattern information value and determining whether an airbag is to be deployed; and (i) generating an electric signal for deployment of an airbag when the deployment of an airbag is determined in step (h).

In an airbag deployment control apparatus and method therefor of the present invention, it is possible to reliably distinguish a slight crash from a serious crash or vice versa using the 3-direction deceleration signals. Further, the development cost of the airbag system and the installation cost thereof become low, since the number of crash tests is reduced and the structure of a vehicle does not need to be changed.

BRIEF DESCRIPTION OF THE DRAWINGS

The above objects and other advantages of the present invention will become more apparent by describing in detail preferable embodiments thereof with reference to the attached drawings in which.

DETAILED DESCRIPTION OF THE PREFERRED EMBODIMENT

Hereinafter, the preferred embodiment of an airbag deployment control apparatus according to the present invention will be described in detail with reference to the drawings.

Figure 1:
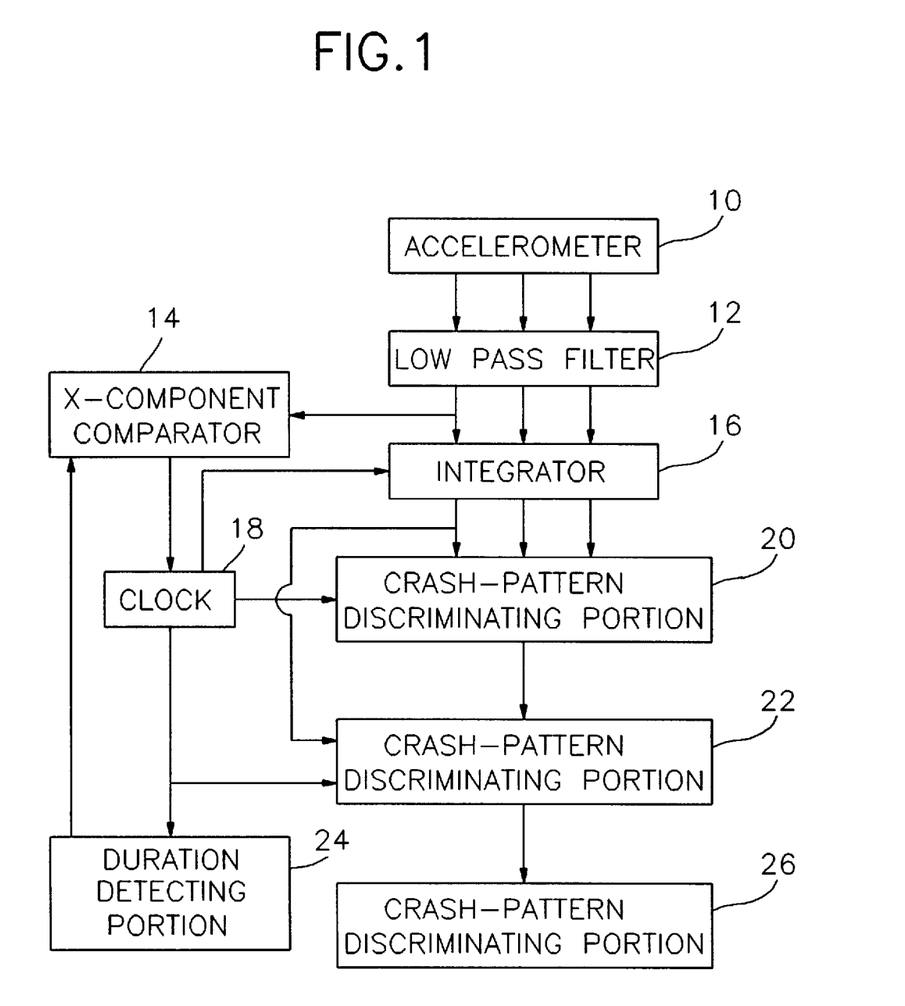
FIG. 1 is a functional block diagram of an airbag deployment control apparatus according to the invention.

In FIG. 1, an accelerometer 10 generates three deceleration signals along X, Y and Z directions perpendicular to one another. Accelerometer 10 may be composed of three one-direction accelerometers or one three-direction accelerometer. In the embodiment, X direction is a traveling direction of a vehicle wherein a forward direction of the traveling direction is a positive direction. Y direction is a right-left direction of a vehicle wherein a left direction is a positive direction. Z direction is an upper-lower direction of a vehicle wherein a upper direction is a positive direction. The 3-direction deceleration signals generated from accelerometer 10 include high frequency components caused by vibration and so on. To remove the high frequency components, the 3-direction deceleration signals are inputted to a low-pass filter 12 for passing only low-frequency components.

The 3-direction deceleration signals outputted from low-pass filter 12 are inputted to an integrator 16 and X direction deceleration signal of the 3-direction deceleration signals also is inputted to an X-component comparator 14. In X-component comparator 14, the X direction deceleration signal is compared with a first threshold. The first threshold is for determining whether a vehicle is traveling under the normal conditions. In X-component comparator 14, storage means may be further included for storing the first threshold. If the X direction deceleration signal is greater than the first threshold, X-component comparator 14 outputs a reset signal to a clock 18, so that clock 18 is reset. A crash timing point, a zero second, is determined by the reset signal from X-component comparator 14.

Figure 4:
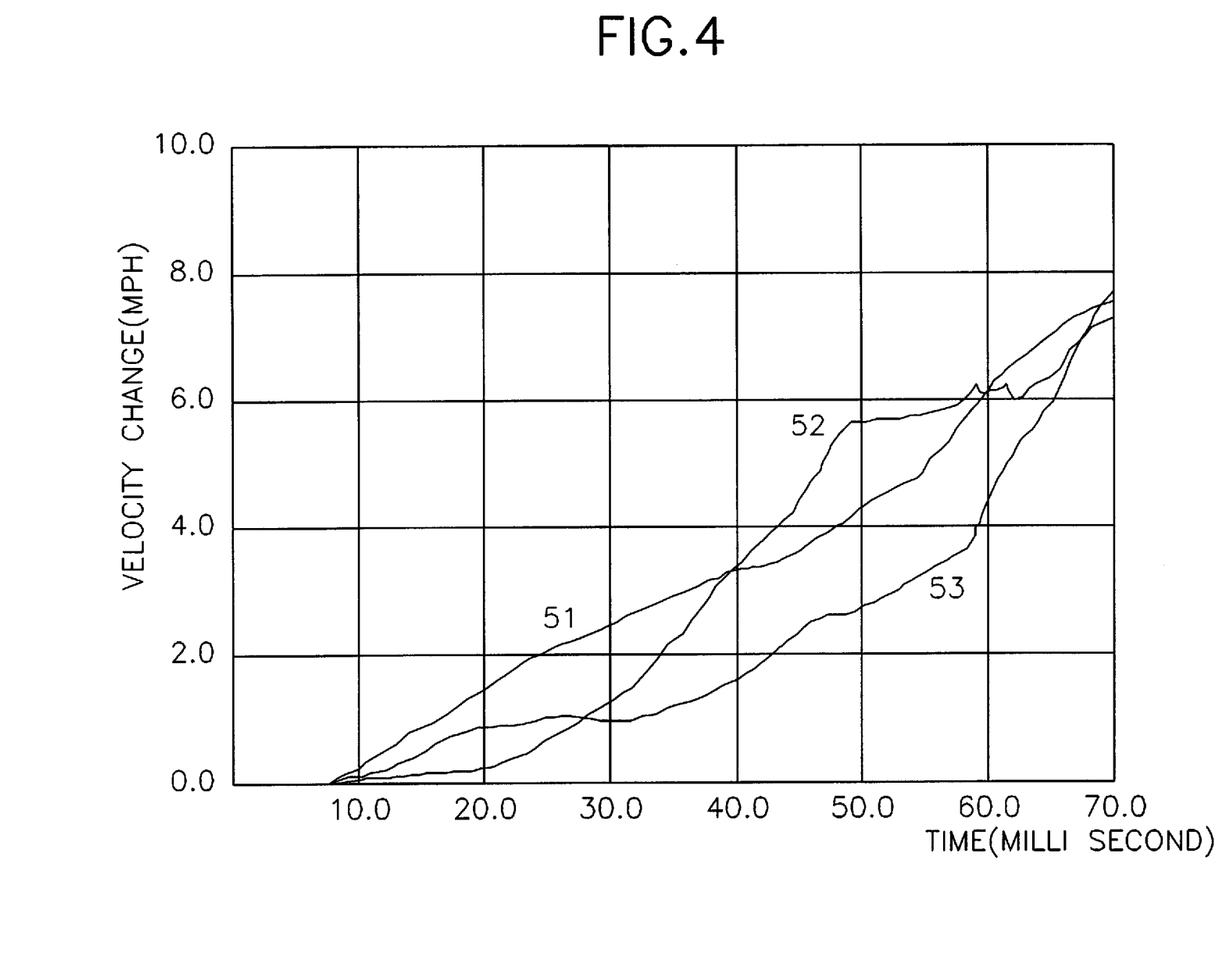
FIG. 4 is a graph showing the primary integral value of the deceleration signal along the front-rear direction of vehicle classified by crash patterns.
Figure 5:
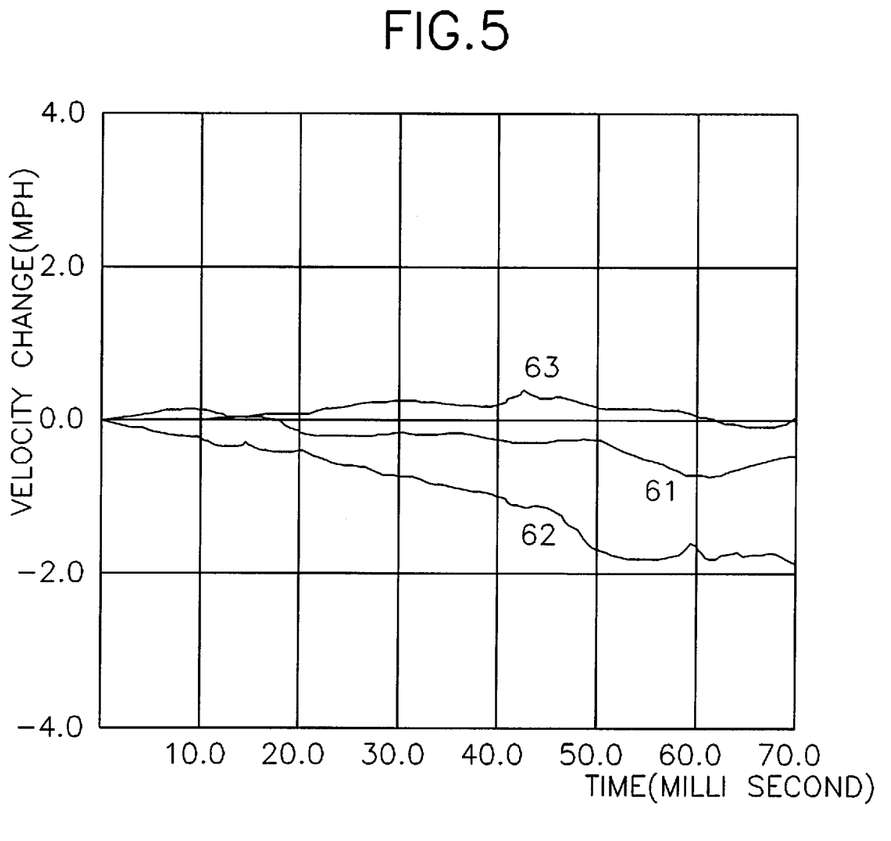
FIG. 5 is a graph showing the primary integral value of the deceleration signal along the right-left direction of vehicle classified by crash patterns.
Figure 6:
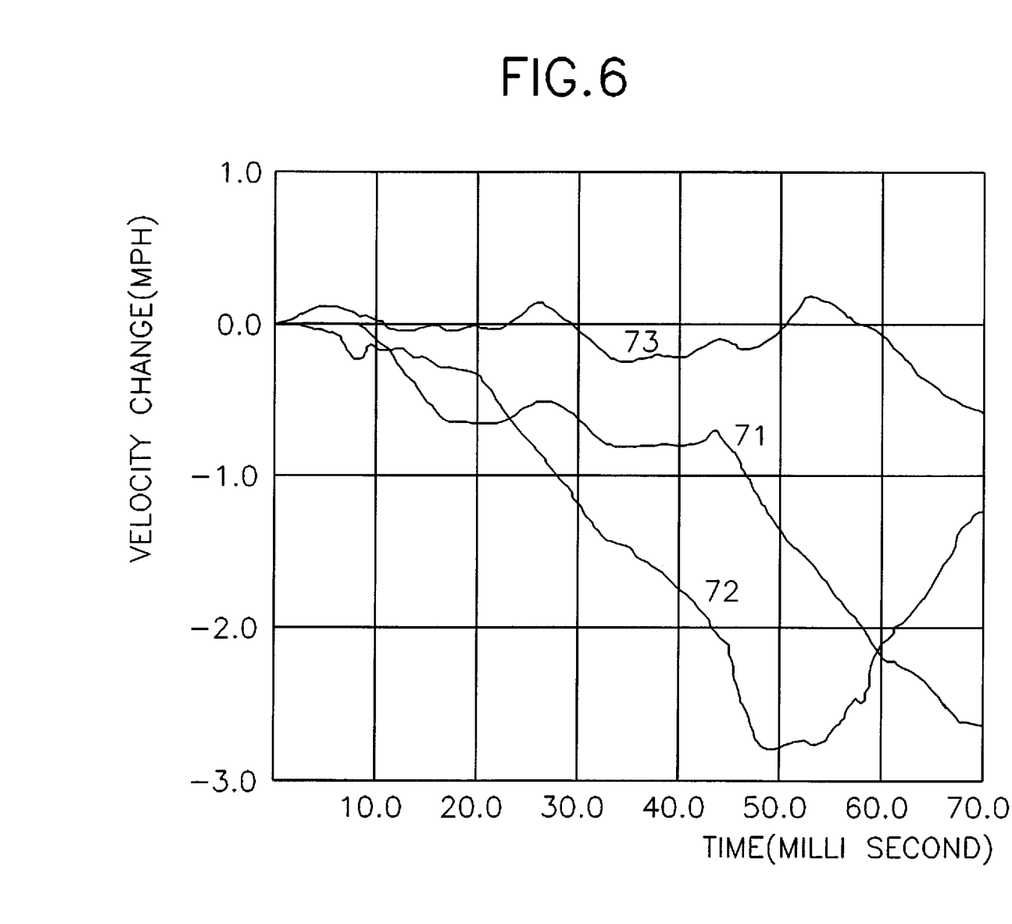
FIG. 6 is a graph showing the primary integral value of the deceleration signal along the upper-lower direction of vehicle classified by crash patterns.

The 3-direction deceleration signals passing through low-pass filter 12 are inputted to integrator 16 and 3-direction velocity change signals are outputted from integrator 16 as shown in FIGS. 4 to 6. The 3-direction velocity change signals are inputted to a crash-pattern discriminating portion 20, in which they are compared with a crash-pattern discriminating threshold to discriminate the crash pattern. In the embodiment, the crash pattern is discriminated by use of a primary integral value of the 3-direction deceleration signals but a secondary integral value thereof may be utilized.

From crash-pattern discriminating portion 20, crash-pattern information is outputted to be inputted to an airbag-deployment determining portion 22. Further, an X-component signal of the 3-direction velocity change signals from integrator 16 is inputted to airbag-deployment determining portion 22. In airbag-deployment determining portion 22, a second threshold is changed in response to crash pattern information from crash-pattern discriminating portion 20 and the X-component signal of the 3-direction velocity change signals is compared with the second threshold changed. In airbag deployment determining portion 22, storage means may be included for storing second thresholds varied by crash patterns. In the embodiment, the deployment of the airbag is determined by use of a primary integral value of an X-component signal of the 3-direction deceleration signals but a secondary integral value thereof may be utilized. Alternatively, the composition signal of the 3-direction velocity change signals may be utilized to determine whether the airbag is to be deployed or not instead of the X-component signal thereof.

If the X-component signal of the 3-direction velocity change signals is greater than the second threshold, airbag-deployment determining portion 22 outputs an airbag deploying signal to an airbag deploying portion 26. Subsequently, airbag deploying portion 26 transmits an electric signal to a squib, so that the airbag is deployed.

Clock 18 reset by the reset signal generated from X-component comparator 14 is forced to operate integrator 16, crash-pattern discriminating portion 20, airbag-deployment determining portion 22 and a duration detecting portion 24. Clock 18 is for providing a united standard time to the overall control apparatus. Duration detecting portion 24 detects the duration for which X-component signal of deceleration signals exceeds the first threshold. If the duration does not exceed a predetermined time, for example 100 ms, duration detecting portion 24 transmits a reset signal to X-component comparator 14 so that X-component comparator 14 is reset. The predetermined time is set so that if the deployment of the airbag is unnecessary, the airbag is not deployed though the vehicle is not traveling under the normal state.

FIG. 4 shows VC curves of X direction classified by crash patterns, FIG. 5 shows VC curves of Y direction classified by crash patterns and FIG. 6 shows VC curves of Z direction classified by crash patterns. In FIGS. 4 to 6, 51, 61 and 71 are VC curves at an 8-mph frontal crash, 52, 62 and 72 are VC curves at a 14-mph 30 degree-angled crash, and 53, 63 and 73 are VC curves at a 16-mph center-pole crash. As shown, the 14-mph 30 degree-angled crash is differentiated from the 8-mph frontal crash at which the deployment of airbag is not required by means of the relatively steep velocity change in Y and Z directions. The 16-mph center-pole crash is differentiated from the 8-mph frontal crash by means of the relatively gentle rise of the velocity change in X direction and the relatively small velocity change in Y and Z directions. Therefore the crash patterns can be differentiated if appropriate thresholds classified by crash patterns are set.

Figure 3:
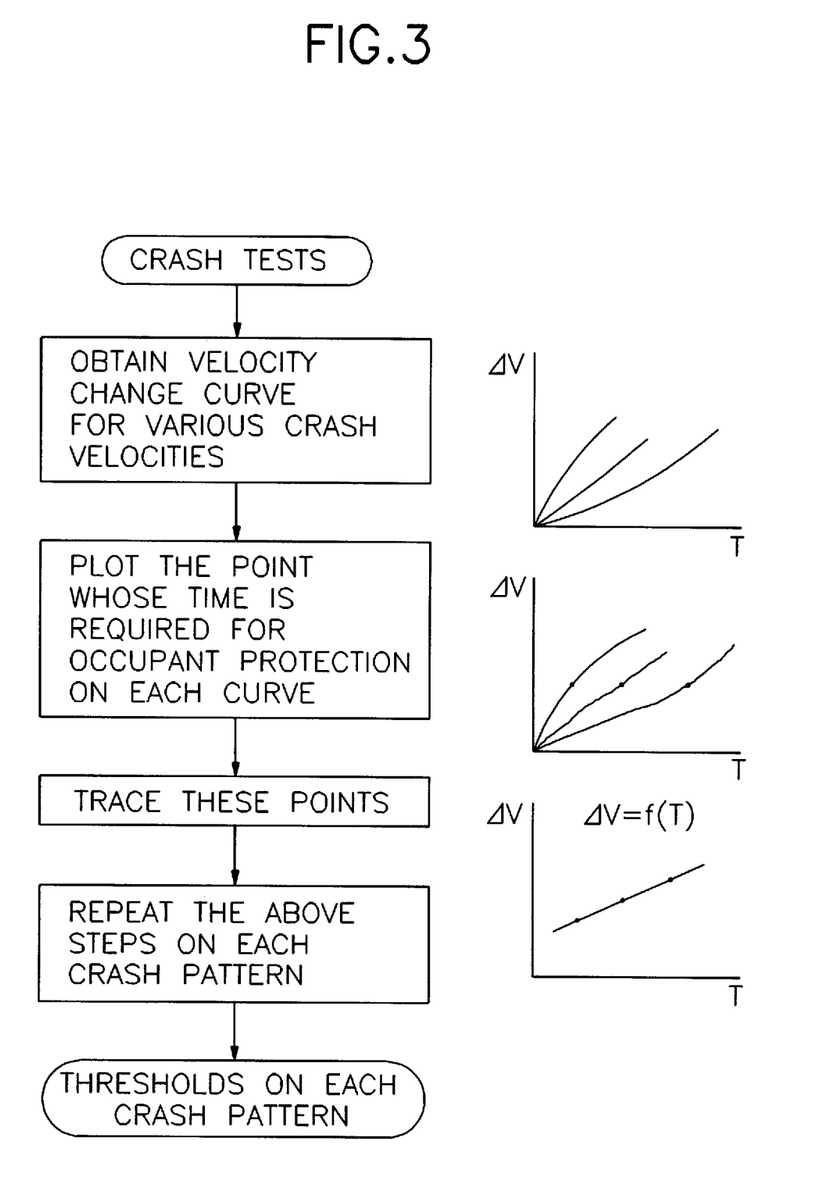
FIG. 3 is an flow chart explaining the procedures for setting the variable threshold classified by crash patterns.

With reference to FIG. 3, one example of the method for setting the second threshold will be described. First, the crash patterns are classified by the pattern which is considered to be the same state when controlling the deployment of airbag. Crash tests are performed at the various crash velocities under each crash pattern classified. As the result of the crash tests, VC curves are obtained. The optimum ignition timing point is plotted on each VC curve. The threshold curve is drawn by tracing these points plotted and is obtained as a function with respect to the time. Thus the second threshold classified by the crash patterns is obtained as a function with respect to the time. The second threshold becomes variable thresholds changed along the time. A threshold value, which is compared with an integral value of X-direction deceleration signal in order to determine whether the airbag is to be deployed, is obtained by substituting a standard time generated from clock 18 into the threshold function.

Figure 2A:
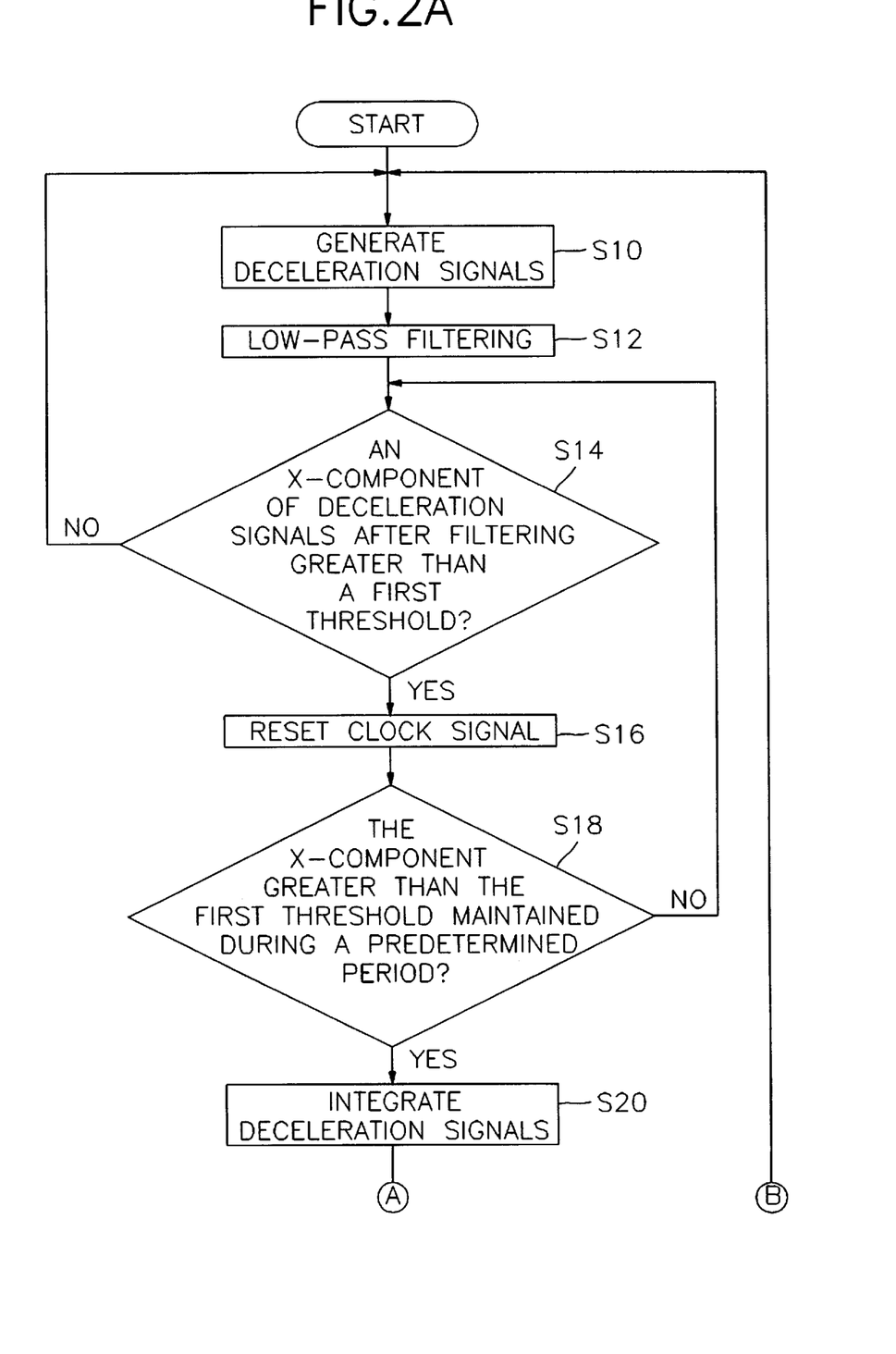
FIG. 2 is a flow chart of an airbag deployment control method according to the invention.
Figure 2B:
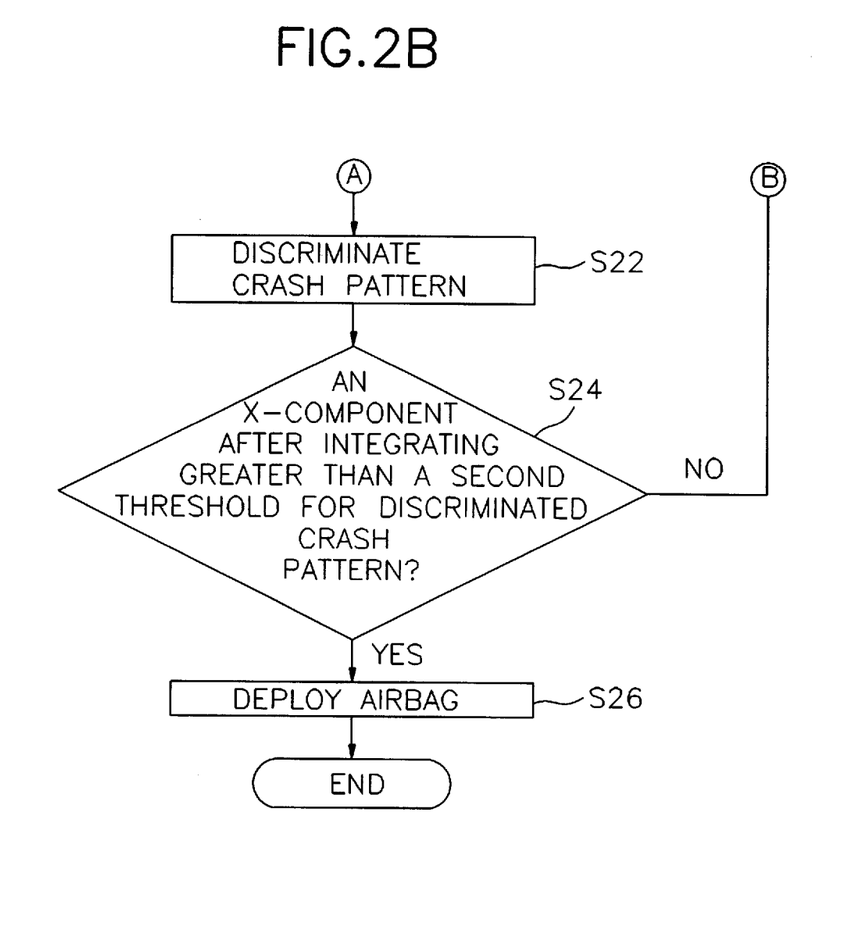

The overall operation of the airbag deployment control apparatus according to the present invention will be described with reference to the flow chart shown in FIG. 2.

In step S10, the 3-direction deceleration signals of vehicle are generated from accelerometer 10. The high frequency components of the 3-direction deceleration signal are removed by passing through low-pass filter 12 (in step S12). The X-direction component of the 3-direction deceleration signal generated in step S12 is compared with the first threshold by means of X-component comparator 14 (in step S14). If the X-direction component is less than the first threshold, the process returns to S10, while if greater, the process advances to step S16 to reset the clock signal.

Subsequently, it is determined whether the state, the X-direction component is greater than the first threshold, is maintained during a predetermined period by means of duration detecting portion 24 (in step S18). If NO, the process returns to step S14, while if YES, the 3-direction deceleration signals are integrated by means of integrator 16 (in step S20). Based upon 3-direction velocity changes obtained by integration, the crash patterns are discriminated by means of crash-pattern discrimination portion 20 (in step S22).

Next, X direction component of 3-direction velocity changes is compared with the second threshold for the crash pattern discriminated (in step S24). If the X-component velocity change is greater than the second threshold, the process advances to step S26 to deploy the airbag (in step S26), while if not, the process returns to step S10.

As described above, it is possible to reliably distinguish a slight crash from a serious crash or vice versa by the airbag deployment control apparatus and method therefor according to the present invention using the 3-direction deceleration signals, while it is impossible by the prior-art system using one-direction deceleration signal.

Further, in the airbag deployment control apparatus according to the present invention, the calibration is completed by only setting the variable threshold classified by crash patterns with respect to a vehicle to be installed. As the result, the development cost of the airbag system and the installation cost thereof become low, since the number of crash tests is reduced and the structure of vehicle does not need to be changed.

While the present invention has been particularly shown and described with reference to preferred embodiment thereof, it will be understood by those skilled in the art that various changes in form and details may be effected therein without departing from the spirit and scope of the invention as defined by the appended claims.

What is claimed is:

1. An airbag deployment control apparatus for an automotive vehicle, comprising:

3-direction deceleration sensing means for sensing vehicle deceleration due to crash and generating 3-direction deceleration signals;

low-pass filter means for removing high-frequency components of said 3-direction deceleration signals outputted from said 3-direction deceleration sensing means;

integrator means for integrating outputs from said low-pass filter means;

first-direction component comparing means for comparing a first-direction component of said outputs from said low-pass filter means with a threshold for first direction;

crash-pattern discriminating means responsive to said integrator means for discriminating crash patterns based upon outputs from said integrator means and generating a crash-pattern information value;

airbag-deployment determining means responsive to said crash-pattern discriminating means for comparing the output from said integrator means with a threshold for crash pattern corresponding to said crash-pattern information value and determining whether an airbag is to be deployed;

clock signal generating means for generating clock signals in order to provide a standard time, said clock signal generation means being reset in response to a reset signal outputted from said first-direction component comparing means when said first-direction component exceeds said threshold for first direction;

duration detecting means being reset responsive to said clock signal generating means for detecting a duration period wherein said first-direction component exceeds said threshold for first direction and providing a reset signal to said first-direction component comparing means to reset said first-direction component comparing means when said duration period does not exceed a predetermined period; and airbag deploying means for generating an electric signal for deploying said airbag in response to an airbag deploying signal from said airbag-deployment determining means.

2. The airbag deployment control apparatus as claimed in claim 1, wherein said 3-directions are X, Y and Z directions perpendicular to one another, said X-direction is a traveling direction of a vehicle, said Y-direction is a right-left direction thereof, said Z-direction is an upper-lower direction thereof, and said first direction is said X-direction.

3. The airbag deployment control apparatus as claimed in claim 1, wherein said first-direction component comparing means includes a first storage means for storing said threshold for first direction, and said airbag-deployment determining means includes a second storage means for storing said threshold for crash pattern.

4. The airbag deployment control apparatus as claimed in claim 1, wherein said crash-pattern discriminating means discriminates crash patterns by comparing a primary integral value of said 3-direction deceleration signals with a threshold for discrimination of crash patterns based on said standard time provided from said clock signal generating means.

5. The airbag deployment control apparatus as claimed in claim 1, wherein said crash-pattern discriminating means discriminates crash patterns by comparing a secondary integral value of said 3-direction deceleration signals with a threshold for discrimination of crash patterns based on said standard time provided from said clock signal generating means.

6. The airbag deployment control apparatus as claimed in claim 1, wherein said airbag-deployment determining means determines whether said airbag is to be deployed by comparing a primary integral value of said first-direction component of said 3-direction deceleration signals with said threshold for crash pattern corresponding to the crash pattern discriminated in said crash-pattern discriminating means.

7. The airbag deployment control apparatus as claimed in claim 1, wherein said airbag-deployment determining means determines whether said airbag is to be deployed by comparing a secondary integral value of said first-direction component of said 3-direction deceleration signals with said threshold for crash pattern corresponding to the crash pattern discriminated in said crash-pattern discriminating means.

8. The airbag deployment control apparatus as claimed in claim 1, wherein said airbag-deployment determining means determines whether said airbag is to be deployed by comparing a primary integral value of a composition signal of said 3-direction deceleration signals with said threshold for crash pattern corresponding to the crash pattern discriminated in said crash-pattern discriminating means.

9. The airbag deployment control apparatus as claimed in claim 1, wherein said airbag-deployment determining means determines whether said airbag is to be deployed by comparing a secondary integral value of a composition signal of said 3-direction deceleration signals with said threshold for crash pattern corresponding to the crash pattern discriminated in said crash-pattern discriminating means.

10. The airbag deployment control apparatus as claimed in claim 1, wherein clock signals generated from said clock signal generating means are provided to said integrator means, said crash-pattern discriminating means, said airbag-deployment determining means and said duration detecting means to operate each of them.

11. An airbag deployment control method, comprising the steps of:

(a) sensing vehicle deceleration due to crash and generating 3-direction deceleration signals;

(b) removing high-frequency components of said 3-direction deceleration signals;

(c) comparing a first-direction component of said 3-direction deceleration signals removing high-frequency components with a threshold for first direction;

(d) resetting a clock signal when said first-direction component exceeds said threshold for first direction as a result of the comparison in step (c);

(e) determining whether the state that said first-direction component exceeds said threshold for first direction is maintained over a predetermined period;

(f) integrating said 3-direction deceleration signals removing high-frequency components when said state is maintained over said predetermined period as a result of the determination in step (e);

(g) discriminating a crash pattern based upon the integral value of said 3-direction deceleration signals and generating a crash-pattern information value;

(h) comparing said integral value with a threshold for crash pattern corresponding to said crash-pattern information value and determining whether an airbag is to be deployed; and (i) generating an electric signal for deployment of said airbag when the deployment of said airbag is determined in step (h).

12. The airbag deployment control method as claimed in claim 11, wherein said 3-directions are X, Y and Z directions perpendicular to one another, said X-direction is a traveling direction of a vehicle, said Y-direction is a right-left direction thereof, said Z-direction is an upper-lower direction thereof, and said first direction is said X-direction.

13. The airbag deployment control method as claimed in claim 11, wherein said 3-direction deceleration signals are integrated once in step (f) and said integral value is the primary integral value of said 3-direction deceleration signals.

14. The airbag deployment control method as claimed in claim 11, wherein said 3-direction deceleration signals are integrated twice in step (f) and said integral value is the secondary integral value of said 3-direction deceleration signals.

15. The airbag deployment control method as claimed in claim 11, wherein in step (h), the primary integral value of said first-direction component of said 3-direction deceleration signals is compared with said threshold for crash pattern corresponding to said crash-pattern information value.

16. The airbag deployment control method as claimed in claim 11, wherein in step (h), the secondary integral value of said first-direction component of said 3-direction deceleration signals is compared with said threshold for crash pattern corresponding to said crash-pattern information value.

17. The airbag deployment control method as claimed in claim 11, wherein in step (h), the primary integral value of the composition signal of said 3-direction deceleration signals is compared with said threshold for crash pattern corresponding to said crash-pattern information value.

18. The airbag deployment control method as claimed in claim 11, wherein in step (h), the secondary integral value of the composition signal of said 3-direction deceleration signals is compared with said threshold for crash pattern corresponding to said crash-pattern information value.

* * * * *